United States Patent [19]
Anderson et al.

[11] 3,754,330
[45] Aug. 28, 1973

[54] SAW CHUCK

[76] Inventors: Charles L. Anderson; Andrew Anderson, both of Rt. 1, Box 198, Antioch, Ill. 60030

[22] Filed: June 5, 1972

[21] Appl. No.: 259,799

[52] U.S. Cl. .................................. 30/392, 83/698
[51] Int. Cl. ........................................ B27b 11/06
[58] Field of Search ................ 30/166, 392, 393, 30/394, 374, 375, 376, 377; 83/699, 697, 698; 279/83; 145/108 R, 108 A, 108 B

[56] References Cited
UNITED STATES PATENTS

| | | | |
|---|---|---|---|
| 857,151 | 6/1907 | Booth | 279/83 |
| 2,619,132 | 11/1952 | Pierce | 30/394 |
| 3,056,437 | 10/1962 | Mittins | 30/374 |
| 3,412,767 | 11/1968 | Green | 30/392 |
| 3,496,972 | 2/1970 | Rees | 30/376 |

Primary Examiner—James L. Jones, Jr.
Assistant Examiner—J. C. Peters
Attorney—Edward L. Benno

[57] ABSTRACT

A chuck for a portable reciprocating power saw wherein the chuck is of a minimum length and will firmly hold saw blades of various widths.

5 Claims, 5 Drawing Figures

Patented Aug. 28, 1973

3,754,330

3,754,330

SAW CHUCK

BACKGROUND OF THE INVENTION

Many different chucks have been and are presently used on portable reciprocating power saws. Reciprocating power saws are generally sold with integral chucks by the manufacturer of the saw, and such chucks are commonly constructed to only accept the particularly shaped saw blades sold by the manufacturer of the saw. Such arrangements are uneconomical and inefficient because the user of the saw must constantly keep a stock of special blades on hand.

Further, many chucks presently used on portable reciprocating power saws have poor arrangements for tightening and maintaining the tightened condition of the blade in the chuck.

Additionally, many chucks presently used on portable reciprocating power saws are poorly arranged for removal of the shank of a blade remaining in the chuck when the blade breaks off at the front of the chuck.

SUMMARY OF THE INVENTION

The chuck of the present invention is a simple, convenient arrangement which is relatively short in length, which is easily applied to the reciprocating shaft of known portable saws, which provides for easy removal of the broken shank of a blade in the chuck, and which readily accepts and firmly holds blades of different widths.

The foregoing advantages of the present invention, while of substantial importance to even an occasional user of such portable reciprocating power saws, are of extreme importance to the craftsman who daily uses a power saw in his work. Such power saws are rugged tools while the blades are of necessity relatively fragile. Use of such saws by builders, carpenters, plumbers and sheet metal craftsmen requires that the saws be constantly interchangeably used for cutting many different materials such as wood joists, floors and walls, plaster, metals and plastics. Such heavy and varied uses require that the blades be changed to provide different tooth configurations and sizes for different cutting functions, and to replace dull or broken blades. In reductions to practice of the present invention it has been found that blades with special shanks are not required. Any available stock blades of different shanks and widths are easily inserted and locked into the chuck, firmly held therein under heavy sawing conditions, and easily replaced even when broken at the front of the chuck.

The primary object of the present invention is to provide a simple, compact, relatively short, chuck for known portable reciprocating power saws which will accept a wide range of commonly available blades, which will firmly hold the blades for cutting, and from which blades or blade parts may be easily removed.

The primary object of the present invention is achieved by a basic chuck construction in which, among other elements, the saw shaft slot and the blade slot are overlapped and in which the rear portion of the blade slot is open.

Other objects and features of the invention will be apparent upon a perusal of the hereinafter following specification and the drawing.

DETAILED DESCRIPTION OF THE DRAWING

DETAILED DESCRIPTION OF THE PREFERRED EMBODIMENT

Figure 1:
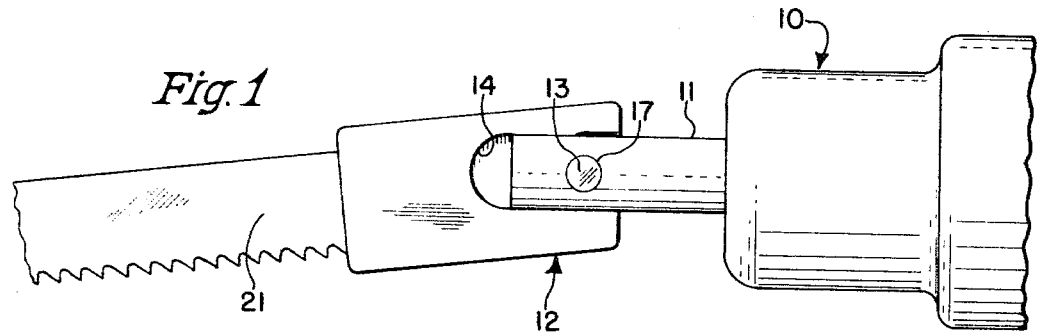
FIG. 1 is an elevational view of a chuck constructed according to the invention with fragmentary portions of a blade and a portable reciprocating power saw.
Figure 2:
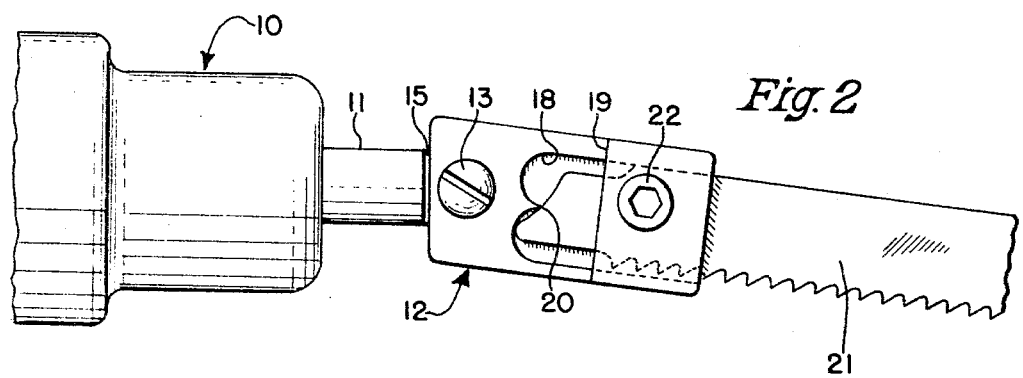
FIG. 2 is an elevational view of the structure of FIG. 1 viewed from the opposite side.

A fragmentary view of a known portable reciprocating power saw is shown at 10 in FIGS. 1 and 2. The saw 10 reciprocate an extending shaft 11 which is caused to axially reciporate when the saw is operated.

The preferred embodiment of the invention which is shown at 12 comprises a one-piece chuck assembly. The chuck 12 is generally rectangularly shaped and secured to the shaft 11 of the saw 10 by a fastener 13. To receive the end of the shaft 11, one side of the chuck 12 is provided with a shallow slot 14. The outer end of the slot 14 is open and the inner end terminates in a semicircular wall portion. The slot 14 has a width substantially equal to the width or diameter of the end of the shaft 11 of the saw 10. The longitudinal axis of the slot 14 is disposed at an angle to the longitudinal axis of the chuck 12 so that the chuck 12 is angled slightly downwardly when applied to the shaft 11 of the saw 10. The rear end wall of the chuck 12 is perpendicular to the longitudinal axis of the slot 14.

Figure 4:
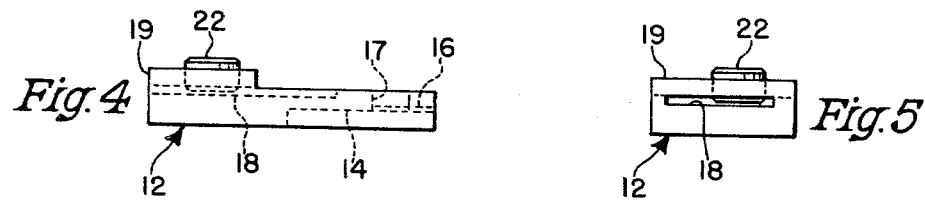
FIG. 4 is a top plan view of the structure shown in FIG. 3.
Figure 5:
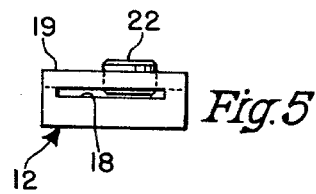
FIG. 5 is an end view of the structure of FIGS. 3 and 4 taken from the front of the chuck.
Figure 3:
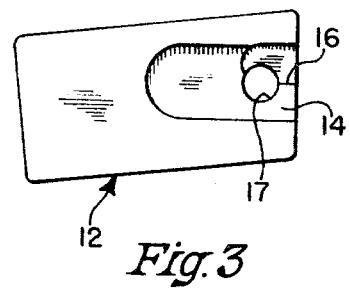
FIG. 3 is an elevational view according to FIG. 1 with the blade and saw removed.

Preferred forms of the saw 10 are provided with circular shafts 11 the outer end portion of which is formed with a flat portion indicated at 15 in FIG. 2. The flat portion of the shaft 11 is received within the slot 14 as shown in FIG. 1. The flat portion of one known saw is formed in two steps or levels, one of which will be received within the deeper slot portion 16 shown in FIGS. 3 and 4.

The chuck 12 is further provided with a hole 17 extending therethrough and into the slot 14 to receive the fastener 13. One known saw 10 is provided with a threaded hole which with which the hole 17 may be axially aligned to receive the fastener 13 to secure the chuck 12 to the shaft 11. If the hole in the shaft 11 is not threaded, the hole 17 may be threaded and the fastener 13 is then inserted from the opposite side to secure the chuck 12 to the shaft 11.

The side of the chuck 12 opposite from the side having the slot 14 is provided with a slot 18 which extends parallel to the longitudinal axis of the chuck 12. The forward side portion of the slot 18 is transversely covered by a blade securing cover portion 19. The portion 19 is formed as an integral part of the chuck 12, and the slot 18 has a depth sufficient to receive the thickest blade intended to be used with the chuck 12. The longitudinal inner end of the slot 18 terminates adjacent to the hole 17. This arrangement provides for a substantial longitudinal overlap of the slots 14 and 18. The invention contemplates that the length of the chuck 12 may be reduced from that shown in the drawing by a further longitudinal overlap of the slots 14 and 18 with the slot 18 terminating immediately adjacent to the hole 17.

The forward end of the slot 18 opens into the forward end wall of the chuck 12. The forward end wall of the chuck 12 is perpendicular to the longitudinal axis of the slot 18.

The rearward end of the slot 18 terminates in an end wall which is formed as two adjacent semicircles defining a projection 20 which is directed longitudinally forwardly of the chuck 12 along the longitudinal axis of the slot 18. The inner end wall of the slot 18 will cooperate with blades of various widths from a blade as wide as the slot 18 to blades of less than one half the width of the slot 18 to engage the inner end of the blade and hold the blade against pivoting in the plane of the blade.

A blade, such as blade 21, is secured in the slot 18 by a fastener 22. The fastener 22 is threaded through an appropriate hole in the portion 19 as shown in the drawing. The inner end of the fastener 22 is urged against one side of the blade 21 to firmly lock the blade 21 within the slot 18.

The open rearward portion of the slot 18 enables a user to visually observe that the blade 21 is completely seated against the inner end wall of the slot 18, and further provides an easy arrangement for removing the remaining or shank portion of a blade which in use may break flush with the forward end of the chuck 12. Once the fastener 22 is loosened an instrument such as a screwdriver may be used to urge the remaining portion of a broken blade forwardly out of the slot 18 sufficiently to enable one to grasp the forward end of the remaining portion and draw it from the chuck 12.

Having described the invention, it is to be understood that the preferred embodiment may be changed by one skilled in the art within the spirit and scope of the hereinafter following claims.

We claim:

1. A chuck for a portable reciprocating power saw comprising, a substantially rectangular member, a first slot in one side of said member, said first slot opening into one end of said member and adapted to receive the operating shaft of a portable reciprocating power saw therein, first fastening means for securing said shaft in said first slot, a second slot formed in said member in the side thereof opposite from said one side, said second slot opening into the other end of said member opposite from said one end, said member having an integral cover portion extending transversely over a longitudinal portion of said second slot, said cover portion extending from said other end of said member to a position intermediate the ends of said second slot, the portion of said second slot longitudinally between said cover portion and the inner end of said second slot being open, the inner end portions of said first and second slots longitudinally overlapping, said second slot adapted to receive one end of a saw blade therein with said blade extending from said other end of said member, and second fastening means in said member for securing said blade in said member.

2. In a chuck as defined in claim 1, wherein the longitudinal axis of said first slot is disposed at an angle to the longitudinal axis of said member, and said one end of said member lies in a plane perpendicular to the longitudinal axis of said first slot.

3. In a chuck as defined in claim 1, said first fastening means comprising a fastener extending through said member and said shaft perpendicular to the longitudinal axis of said shaft.

4. In a chuck as defined in claim 1, the inner end of said second slot being configured as two contiguous semicircles with the juncture of said semi-circles forming a projection extending along the longitudinal axis of said second slot and toward said other end of said member.

5. In a chuck as defined in claim 1, said second fastening means comprising a fastener threaded through said cover portion in a direction perpendicular to the plane of said second slot and any blade carried therein to engage one side of said blade in an urging relationship of said blade against the bottom wall of said second slot.

* * * * *